United States Patent [19]

Darrow et al.

[11] 4,185,369
[45] Jan. 29, 1980

[54] METHOD OF MANUFACTURE OF COOLED TURBINE OR COMPRESSOR BUCKETS

[75] Inventors: Kenneth A. Darrow, Sprakers; Gasper Pagnotta, Rexford, both of N.Y.

[73] Assignee: General Electric Company, Schenectady, N.Y.

[21] Appl. No.: 889,111

[22] Filed: Mar. 22, 1978

[51] Int. Cl.² ............................................. B23P 15/04
[52] U.S. Cl. ..................... 29/156.8 B; 29/156.8 H; 29/157.3 C; 165/170; 165/185; 416/92; 416/97 A; 228/175; 228/183
[58] Field of Search ................ 29/156.8 H, 156.8 B, 29/157.3 C; 228/182, 183, 175, 174; 165/170, 171, 169, 78, 185; 416/95, 96 R, 97 R, 97 A, 92

[56] References Cited

U.S. PATENT DOCUMENTS

| | | | |
|---|---|---|---|
| 2,256,272 | 9/1941 | Batcheller | 228/175 |
| 2,522,365 | 9/1950 | Greene | 29/157.3 C |
| 2,641,439 | 6/1953 | Williams | 29/156.8 B |
| 2,695,146 | 11/1954 | DeWitt | 416/95 |
| 2,811,761 | 11/1957 | Bauer | 165/168 |
| 2,994,124 | 8/1961 | Denny et al. | 416/96 |
| 3,091,846 | 6/1963 | Henry | 228/181 |
| 3,301,530 | 1/1967 | Lull | 416/241 |
| 3,619,076 | 11/1971 | Kydd | 416/92 |
| 3,856,433 | 12/1974 | Grondahl et al. | 416/97 |
| 3,952,939 | 4/1976 | Schilling et al. | 228/193 |

FOREIGN PATENT DOCUMENTS

| | | | |
|---|---|---|---|
| 730114 | 1/1943 | Fed. Rep. of Germany | 165/169 |
| 816686 | 10/1951 | Fed. Rep. of Germany | 165/168 |
| 388865 | 7/1973 | U.S.S.R. | 228/156 |

*Primary Examiner*—Daniel C. Crane
*Attorney, Agent, or Firm*—Leo I. MaLossi; Joseph T. Cohen

[57] ABSTRACT

Methods are disclosed for more practical construction of liquid-cooled buckets able to efficiently transport heat energy from the inside of the airfoil skin surface in contact with hot gas to the outer surface of preformed tubes recessed into the bucket core, through which tubes liquid coolant is passed during operation. The bucket is made of a series of preformed solid components, which are assembled, consolidated and then converted into a unified structure. In each arrangement illustrated one of the preformed solid components is a flat bimetallic sheet comprising an erosion, corrosion resistant layer and a layer of high thermal conductivity, these layers being joined by an optimized metallurgical bond.

14 Claims, 5 Drawing Figures

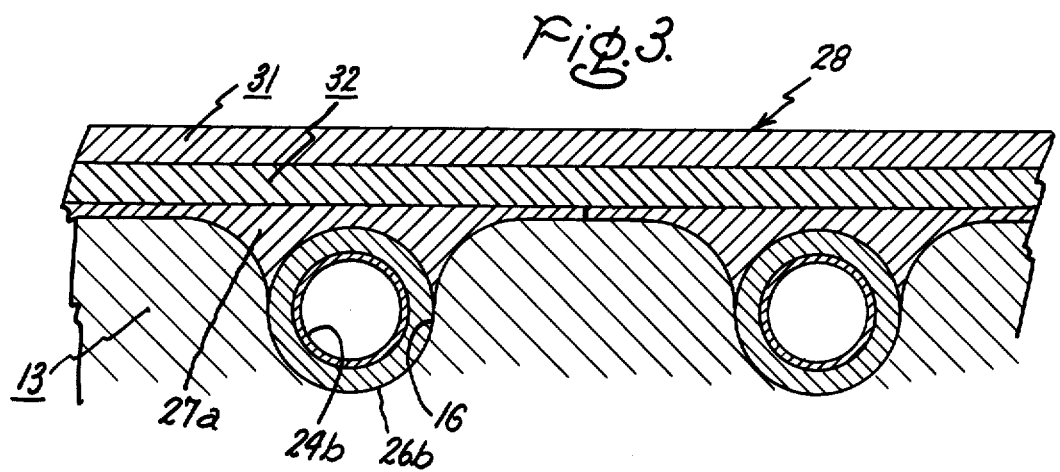
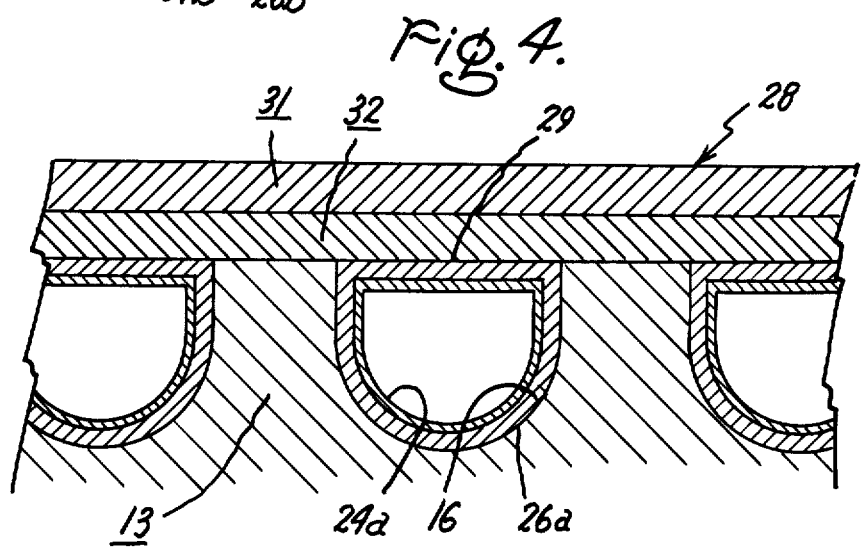
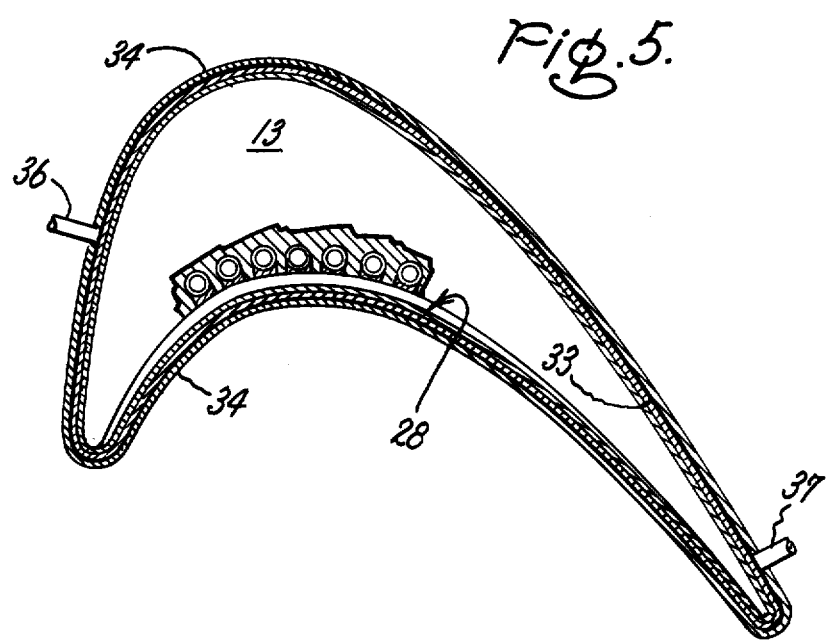

METHOD OF MANUFACTURE OF COOLED TURBINE OR COMPRESSOR BUCKETS

BACKGROUND OF THE INVENTION

This invention relates to processes for producing a turbine or compressor bucket, or blade, having a plurality of passages therein relatively close to the surface of the bucket for the passage of liquid therethrough in order to cool the bucket during operation.

One such process is described in U.S. Pat. application Ser. No. 749,719—Anderson, filed Dec. 13, 1976, and assigned to the assignee of the instant invention.

The Anderson application discloses a liquid-cooled gas turbine bucket comprised of a core having radially extending grooves of rectangular cross-section recessed into the core, tubing fitted into these grooves and bonded in place by means of braze material filling in the space between the tubes and the sides and bottom of the grooves, and a protective skin bonded to the outer surface of the core to provide corrosion resistance. The skin is described as a composite of an inner skin which provides high thermal conductivity and an outer skin which provides protection from hot corrosion. However, there is no disclosure of any performing of the composite skin or any attempt to optimize the bond between the inner and outer skin materials.

The disclosure in the Anderson application of useful materials for preparation of the outer skin, the inner skin, the tubing and the bucket core is incorporated by reference.

The general method of incorporating an assembly to be brazed in a flexible envelope for the establishment within the envelope of a substantially non-oxidizing atmosphere and providing for force application to the envelope during brazing is disclosed in U.S. Pat. No. 3,091,846—Henry. The disclosure therein is incorporated by reference.

DESCRIPTION OF THE INVENTION

Methods are disclosed for more practical construction of liquid-cooled buckets able to efficiently transport heat energy from the inside of the airfoil skin surface in contact with hot gas to the outer surface of performed tubes recessed into the bucket core, through which tubes liquid coolant is passed during operation. The bucket is made of a series of performed solid components, which are assembled, consolidated and then converted into a unified structure. In each arrangement illustrated one of the preformed solid components is a flat bimetallic sheet comprising an erosion, corrosion resistant layer and a layer of high thermal conductivity, these layers being joined by an optimized metallurgical bond. The bonding together of the layers comprising the bimetallic sheet, with these layers disposed in the flat is particularly important, because it offers the best opportunity to achieve perfect bonding between these layers. The bond between these two layers comprising the bimetallic skin is considered the mosst critical bond in the whole assembly process. In the event of imperfect bonding at this location, hot spots will develop in the composite skin leading to its destruction.

The use of preformed solid components as described herein considerably simplifies the assembly, consolidation and unification of the completed bucket structure.

BRIEF DESCRIPTION OF THE DRAWING

The features of this invention believed to be novel and unobvious over the prior art are set forth with particularity in the appended claims. The invention itself, however, as to the organization, method of operation and objects and advantages thereof, may best be understood by reference to the following more detailed description taken in conjunction with the accompanying drawing wherein:

FIGS. 3 and 4 are sectional views taken through two other embodiments resulting from the practice of this invention; and, FIG. 5 is a schematic view showing the disposition in a flexible metal bag of the initial assembly with the bimetallic sheet preformed in a closed loop thereabout preparatory to forcing the preformed solid components into a consolidated assembly and heating to convert this assembly into a unified structure.

MANNER AND PROCESS OF MAKING AND USING THE INVENTION

Figure 1:
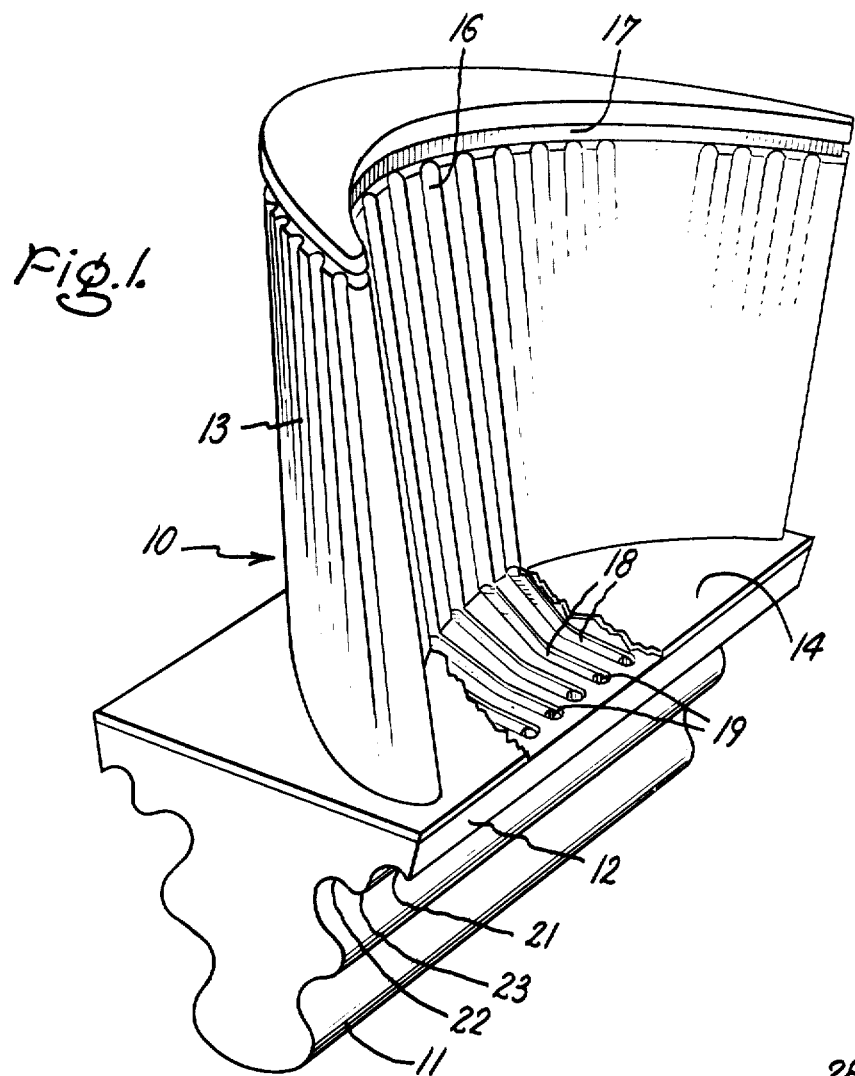
FIG. 1 is a three-dimensional representation of a core for a liquid-cooled bucket.

The structure shown in FIG. 1 in three-dimensional view and partially cut away is an exemplary turbine bucket construction and the invention is broadly applicable to open-circuit liquid-cooled turbine or compressor buckets or turbine nozzles equipped with sub-surface coolant passages.

As shown, the partially completed turbine bucket 10 consists of the initial load-carrying member of the system, the spar, comprising root portion 11, platform portion 12, and airfoil core 13 with the platform skin 14 brazed thereto. The brazing alloy for applying skin 14 will have been selected as one having a melting temperature higher than any of the subsequent processing temperatures to which the bucket will be exposed. The airfoil core 13 will have been provided with round bottomed, radially extending channels 16 recessed in the surface thereof, as shown. Such channels 16 will have been cast or machined into the surface at intervals around the airfoil core perimeter with the spacing between channels 16 being determined by the local heat flux to which that portion of the bucket 10 will be exposed during operation. As may be seen in FIGS. 2, 3 and 4, the width and depth of each channel 16 will be such that it can properly receive the preformed solid components to be introduced therein in subsequent operations.

At the radially outer ends of coolant passages 16, these passages connect with manifold 17 recessed into the periphery of the airfoil core 13 provided to collect spent coolant from the cooling passages and conduct such coolant out of the turbine bucket. At the radially inner end of recessed channels 16, each such channel is connected with a groove 18 recessed into the surface of platform portion 12, each groove 18 in turn terminating at a hole 19, which passes downwardly through platform 12 to communicate with the platform gutter 21 to which coolant is supplied in the manner to be described hereinafter. As is shown in greater detail in U.S. Pat. No. 3,856,433 - Grondahl et al., open-circuit cooling is accomplished by spraying cooling liquid (usually water) at low pressure in a generally radially outward direction from nozzles (not shown) mounted on each side of the rotor disk (not shown) into which root portion 11 of turbine bucket 10 will be interfitted. The coolant is received in an annular gutter (not shown) and is directed through feed holes (not shown) interconnecting the gutters with reservoirs 22 (two per bucket), each of which extends in the direction parallel to the axis of rotation of the turbine disk.

The liquid coolant accumulates to fill each reservoir 22 (the ends thereof being closed by means of a pair of cover plates as yet not applied to the ends of bucket 10). As liquid coolant continues to reach each reservoir 22, the excess discharges over the crest of weir 23 along the length thereof and is thereby metered to the side of the bucket on which that particular weir is located.

Coolant that has traversed a given weir crest 23 continues in the generally radial direction to enter the longitudinally-extending platform gutter 21 as a film-like distribution, passing thereafter outwardly through the coolant channel feed holes 19. Coolant passes from holes 19 to manifold 17 via the platform and vane coolant grooves and tubular constructions to be described hereinafter.

Next, each of the recessed channels 16 is to receive therein a preformed conduit provided with a surrounding layer of high thermal conductivity metal matallurgically bonded over the outer surface thereof and having a contour to match the configuration of the bottom of recess 16. By this composite construction, a solid preformed component is provided wherein the inner member, tube 24, 24a or 24b, as shown, is made of a material selected to withstand the erosion and corrosion of the hot water and steam to be conducted therein and the surrounding layer of metal 26, 26a and 26b is selected in order to provide both a high heat transfer rate completely around the inner tube and a good match with the configuration of the bottom of channel 16. Optimal heat transfer is provided in this composite construction by providing a good metallurgical bond between elements 24, 26; 24a, 26a and 24b, 26b, respectively. In the preferred construction, the inner tube (24, 24a, 24b) is prepared from 347 stainless steel and the surrounding layer (26, 26a, 26b) is a tube of oxygen-free, high-conductivity copper. The outer surface of the inner tube is plated with a thin layer (about ½ mil) of bright nickel over which a layer of silver (about ½ mil) is applied. The two tubes are interfitted and then drawn through a series of drawing dies until a snug metal-to-metal fit is obtained, after which the composite is fired at about 800° C. to form the silver-copper eutectic alloy joining these tubes. Thereafter, the composite tube is plated with a similar layer of silver to provide a brazing agent to permanently affix the composite tube into channel 16 as described hereinafter.

Figure 2:
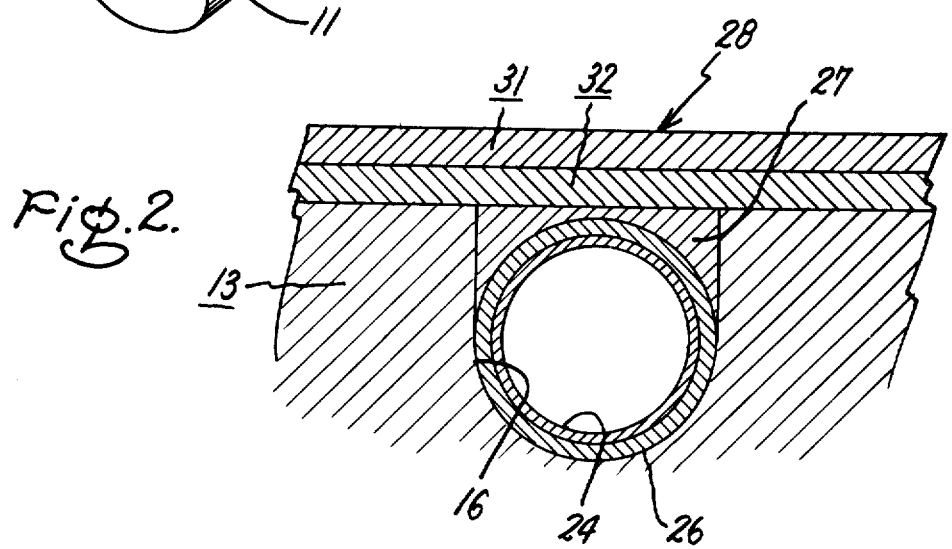
FIG. 2 is a sectional view taken through the surface region of a turbine bucket completed according to the practice of this invention, the view being taken in a plane transverse to the preformed conduit disposed in any of the recessed channels shown exposed in FIG. 1.

In the constructions shown in FIGS. 2 and 3, the relative dimensions of the recessed channel 16 and the composite tube are so selected, that in each instance the composite tube is received in channel 16 with a significant space, or volume, remaining to completely fill channel 16 flush with the surface of core 13. In order to fill this gap or space, a filler strip 27, 27a of the proper length is provided having its shape in transverse cross-section conform at least in part to the shape required to fill this space. In the case of filler strip 27a, in addition to filling this space, thin flanges are provided to overlap portions of airfoil core 13 to either side of channel 16 to increase the area of contact with the bimetallic skin 28 to be applied thereover. In each instance these filler strips are made of a high thermal conductivity metal, preferably oxygen-free, high conductivity (OFHC) copper. In each instance the filler strip is silver plated in order to provide a means for tacking the filler strip into place during assembly and, also, to provide for brazing to hold the filler permanently in place.

Thus, with respect to the construction of FIGS. 2 and 3, after the composite tube has been introduced into channel 16, the filler strip is introduced thereover, held in place and spot brazed along its edges. This spot brazing is accomplished by introducing welding current at the edge or corner of the filler strip to raise the temperature thereof sufficient to locally form a silver-copper braze alloy that melts at 780° C. The number of such braze spots provided should be sufficient to keep the filler strip and composite tube in place until the outer skin 28 can be applied.

With respect to the construction shown in FIG. 4, the dimensions (in transverse cross-section) of channel 16 and the composite tube disposed therein are selected such that the sum of the perimeter and the width of the open side of recessed channel 16 is substantially equal to the perimeter of the outside of layer of 26a. When composite tubes so proportioned are pressed into place and deformed to provide flat side 29, intimate metal-to-metal contact results between the composite tube and the sides and bottom of recessed channel 16, which is usually sufficient to retain the deformed composite tubes in place. If not, spot brazing can be done, where flattened side 29 abuts airfoil core 13 (the composite tube construction having previously received a coating of silver). After the flattened composite tubes are tacked in place, it may be necessary to remove a small amount of metal from the flattened sides 29 to insure that these surfaces will be flush with the surface of airfoil core 13 in order to provide maximum contact between these flattened, high thermal conductivity faces 29 and the composite skin 28 to be applied thereover.

Numerous variations of rounded bottomed recessed channels 16 may be devised. In each instance, the filler strips are prepared with a configuration in cross-section such that at least part thereof will conform to the shape of the space remaining in channel 16 after having disposed the composite tube construction therein. Each composite tube is installed so that tube 24, 24a or 24b will be in flow communication with a groove 18 and, thereby, with hole 19. In some cases, the composite tube may be L-shaped at the radially inner end to terminate close to hole 19.

The preparation and application of the bimetallic skin 28 will be the same in each instance, the preformed solid components to be introduced prior to the application of skin 28 having been properly affixed in place.

Bimetallic skin 28 is designed not only to resist erosion and corrosion from the high temperature gases to which the bucket will be exposed, but also to be able to carry away the thermal energy entering through the skin so that it can be quickly conducted to the coolant containing passages disposed beneath the skin. To accommodate these widely divergent requirements, the skin is made in two layers, the outer layer 31 being made of an erosion and corrosion resistant material and the inner layer 32 being made of copper or metal containing a very large percentage of copper in order to optimize the coefficient of thermal conductivity.

In preparing such a bimetallic skin, what must be realized is that the bond between layers 31 and 32 is probably the most critical bond to be achieved in this entire construction. Wherever along the interface between these layers the bond is not perfect, hot spots will develop during operation of the turbine, which hot spots will result in destruction of the skin and consequent failure of the bucket. It is for this reason that according to this invention sheets 31 and 32 are bonded together as two flat sheets in contrast to first applying sheet 32 to the airfoil core and then bonding sheet 31 to the previously applied layer 32. It is of particular advantage to employ this method of forming and applying the bimetallic skin, when layer 32 is made of copper. such a bimetallic sheet will have minimum springback when being formed to conform to the airfoil core, because the composite acts in bending much like a sheet of annealed copper except that a higher force is required to accomplish such bending.

Although various gold brazing alloys will work very well for joining together (in the flat) layer 31 and layer 32, such alloys are very expensive. It has been found that brazing of a layer of Inconel 617 and a layer of OFHC copper can very successfully be accomplished utilizing an alloy of 97 percent copper and 3 percent silicon as the brazing alloy. This alloy is inexpensive, has a high melting and flow point (970°–1025° C.) and a still higher remelt temperature. Also, the resulting alloy does not run excessively, thereby minimizing the possibility of plugging open passages during the final braze.

In the brazing operation for joining Inconel 617 to OFHC copper using the copper-silicon alloy described, care must be taken to execute the brazing operation at as low a temperature as possible keeping the time of the braze as short as possible and using the minimum amount of braze alloy necessary to make the bond. These conditions can be accomplished by not exceeding the flow temperature of the alloy by more than about 10°–15° C. and then immediately ceasing the application of heat. The brazing alloy should be disposed between the Inconel 617 sheet (e.g., about 0.025-inch thick) as a thin sheet (about 1 mil or less in thickness). It is preferable to apply a layer of bright nickel (about a few tenths of a mil in thickness) over the surface of the Inconel 617 facing the copper sheet. Such an application reduces the formation of chromium oxides during the braze cycle. The brazing operation to prepare the bimetallic sheet (as with all other brazing operations utilized herein) is conducted in a dry hydrogen, or vacuum environment.

The initial assembly comprises the airfoil core 13 which has platform 12 and root 11 affixed thereto), the composite tubes (embodying the preformed conduits) and whatever material (e.g., the metal around the inner tube 24a force fit to hold the composite tube in place when flattened or the spot brazing of a filler strip) serves to affix the preformed conduits in place in the recessed channels 16. In applying the flat bimetallic skin 28 to this initial assembly, skin 28 is laid out as an area a little smaller than the developed area of the outer surface of such assembly. It is necessary first to closely conform bimetallic skin 28 to the outer surface of airfoil core and then form the conformed skin into a closed loop. This can be accomplished using a brake for the forming operation and checking against the airfoil core. The skin so conformed can be made into a loop either separate from the airfoil core 13 or directly thereon. If made separately from the core, the closed loop is then slid or forced over core 13 and affixed in place as by spot welding small straps or wires from the outer surface of the skin 28 to core 13. These would be removed by grinding, when the skin application has been completed. If the closed loop is to be made in place on the core 13, the two opposing edges of bimetallic skin 28 are butt welded to each other at location 33 (FIG. 5) to form a closed loop as shown. In either case a layer of braze alloy (e.g., a ½-mil thick plating of silver) will have been applied to the surface of inner skin 32 before the forming operation. In the latter case, it would be optional to insert a layer of braze alloy (e.g., a one-mil thick copper-silicon alloy foil) between airfoil core 13 and the bimetallic skin in place of using a plating of silver.

With this operation complete, skin 28 will conform closely to most of the suction side of the bucket, but there will be some space left between skin 28 and portions of the pressure side of core 13. Next, it is necessary to force the closed loop into intimate contact with the initial assembly over substantially the complete inner surface area of the closed loop so as to form a consolidated assembly. Such consolidated assembly is retained in the consolidated state during the brazing operation in which the consolidated assembly is converted into a unified structure.

In order to carry out this final braze, the entire nozzle or bucket 10 is encapsulated in a flexible metal bag 34 in which provisions have been made for introducing the proper environment for the brazing operation via pipes 36 and 37. Pressure is then applied to the outside of envelope 34 by means of a gaseous or hydrostatic medium and while sufficient heat is applied to carry out the brazing operation. This pressure-temperature cycle is described as a hot isostatic pressure (HIP) cycle. Relatively low pressures (e.g., 300–500 psi) are required to hold and, where required, to stretch sheet 28 into intimate contact with the surfce of the initial assembly. The temperature applied will depend upon the alloy used for the final braze. When silver is employed, this temperature would be approximately 800° C.

BEST MODE CONTEMPLATED

In practice the embodiment shown in FIGS. 2 and/or 3 is more apt to be used in a turbine bucket in which the coolant tubes will not be full of coolant during operation, while the embodiment shown in FIG. 4 is more adapted to use in a turbine nozzle wherein the coolant tubes will operate full, or substantially full, of coolant. Both the arrangements shown in FIGS. 2 and 3 may be used in the same bucket depending upon the localized heat flux.

Bimetallic layer 28 is preferably made of Inconel 617 OFHC copper. In bonding these sheets together, the sheets of Inconel and copper with a 1-mil sheet of 97 Cu-3 Si alloy are placed in a hydrogen or vacuum furnace with the copper on top. These sheets rest on a flat support of cold-rolled steel covered with a thin insulating layer of Fiberfrax ® insulation. The sheets are then covered with another layer of Fiberfrax insulation, and a second sheet of cold-rolled steel. Contact between the sheets is fostered by placing a weight on top of this assemblage. Heating proceeds to reach a temperature of about 1030°–1040° C. and is then cut off to avoid unnecessary silicon penetration into the copper.

Thereafter, the closed loop of skin 28 is made as described hereinabove and affixed on the airfoil core. A preformed flexible bag of 304 stainless steel is prepared approximately conforming to the shape of the bucket.

The bucket is enclosed therein, dry hydrogen is flushed through the bag to insure a non-oxidizing environment for the brazing operation. The bag and bucket are placed in a pressurized furnace in which gas pressure and heat can be applied thereto simultaneously as desired. Silver is used throughout as the brazing material. The requisite minimum pressure is applied and when a temperature of ~820° C. has been reached, the heating is stopped.

After the final braze, the bucket and platform skins are connected, as for example, by the general method described in U.S. Pat. No. 3,967,353 - Pagnotta et al. using a shaped fillet strip (e.g., triangular in cross-section) preferably of Inconel 617 and a braze alloy having a melting temperature of approximately 800° C. Cover plates are affixed at the ends of the platform to seal off gutters 21 and reservoirs 22. This structure is then machined (e.g., at the tip, dovetail, platform, etc.) and polished as required.

What we claim as new and desire to secure by Letters Patent of the United States is:

1. In the method of preparing an airfoil-shaped body in which preformed conduits are arranged in channels recessed in an airfoil core, material is disposed adjacent said preformed conduits to affix said preformed conduits in place in said channels, and an erosion-corrosion resistant skin is affixed over this initial assembly comprising said airfoil core, said preformed conduits and said material to provide the outer airfoil surface of said body, the improvement comprising the steps of:
   preparing a flat bimetallic sheet from separate sheets comprising a first flat sheet of erosion and corrosion resistant material and a second flat sheet of metal selected from the group consisting of copper and high copper-content metal, said previously separate first and second sheets being metallurgically bonded together;
   preforming said bimetallic sheet into a closed loop closely matching the outer surface of said initial assembly with a layer of brazing material between said bimetallic sheet and said outer surface;
   forcing said closed loop into contact with said initial assembly over substantially the complete inner surface area of said closed loop to form a consolidated assembly; and
   heating said consolidated assembly in a nonoxidizing environment to brazing temperatures to convert said consolidated assembly into a unified structure while maintaining said forcing step.

2. The improvement recited in claim 1 further including the steps of:
   providing each preformed conduit with a surrounding layer of metal metallurgically bonded over the outer surface thereof, said metal being selected from the group consisting of copper and high copper-content metal; and
   forming each recessed channel in a configuration in which the bottom of said channel approximately matches the outer surface contour of said surrounding layer of metal.

3. The improvement recited in claim 2 further including the step of dimensioning each composite of preformed conduit and surrounding layer of metal such that in a plane passing transversely through said preformed conduit, said layer of metal and the structure defining the recessed channel, the sum of the perimeter of said recessed channel and the width of the open side thereof is substantially equal to the perimeter of the outside of said layer of metal.

4. The improvement recited in claim 3 further including in the process of preparing the initial assembly the step of deforming each preformed conduit and surrounding layer of metal to insure metal-to-metal contact between the outer surface of said surrounding layer and the bottom and sides of the recessed channel wherein it is arranged, said surrounding layer and said preformed conduit being flattened to span across and close off the previously open side of said recessed channel, whereby said surrounding layer functions as the material affixing said preformed conduit in place.

5. The improvement recited in claim 2 further including the steps of:
   dimensioning each composite of preformed conduit and surrounding layer of metal such that in a plane passing transversely through said preformed conduit, through said layer of metal and through the structure defining the recessed channel, said composite is fully received in said recessed channel with a significant space existing below the surface of the airfoil core, said space extending to the surface of said composite and the sides of said recessed channel;
   forming a plurality of filler strips, each of said filler strips having at least a portion thereof in cross-section conforming substantially to the shape of said space and each of said filler strips being made of metal selected from the group consisting of copper and high copper-content metal;
   applying a layer of brazing metal over the surface of said filler strip;
   inserting said filler strips into said recessed channels over said composite; and
   attaching said filler strips to said airfoil core to affix said preformed conduit in place and form the initial assembly.

6. The improvement recited in claim 5 wherein the attaching of the filler strip is accomplished by spot brazing at spaced locations along the edges thereof.

7. The improvement recited in claim 5 wherein the brazing metal applied to the filler strip is silver.

8. The improvement recited in claim 5 wherein substantially the entire filler strip is received in the recessed channel.

9. The improvement recited in claim 5 wherein the second layer of metal embodied in the flat bimetallic sheet, the layers of metal surrounding the preformed conduits and the filler strips are each made of oxygen-free high conductivity copper.

10. The improvement recited in claim 2 wherein a layer of brazing material is applied to the outer surface of the surrounding layer of metal.

11. The improvement recited in claim 1 in which the preparation of the flat bimetallic sheet comprises the steps of
   placing a foil of copper-silicon alloy about 1-mil thick between a flat sheet of Inconel 617 and a flat sheet of oxygen-free high conductivity copper; and
   heating this flat assemblage in an oxygen-free environment to raise the temperature of said alloy to a temperature above the flow temperature thereof and less than about 15° C. in excess thereof and ceasing the heating.

12. The improvement recited in claim 11 wherein the copper-silicon alloy is 97 percent copper and 3 percent silicon by weight.

13. The improvement recited in claim 12 wherein a thin coating of bright nickel is applied to the surface of the Inconel 617 sheet adjacent the copper-silicon alloy foil.

14. The improvement recited in claim 1 wherein the steps of forcing of the closed loop into contact with the initial assembly and heating to brazing temperature are carried out within a flexible metal bag.

* * * * *